(12) United States Patent
McCombs

(10) Patent No.: US 9,518,645 B2
(45) Date of Patent: Dec. 13, 2016

(54) MODULAR FLEXPLATE

(71) Applicant: ACCEL PERFORMANCE GROUP LLC, Cleveland, OH (US)

(72) Inventor: Ross Alan McCombs, Ottummwa, IA (US)

(73) Assignee: Accel Performance Group LLC, Bowling Green, KY (US)

(*) Notice: Subject to any disclaimer, the term of this patent is extended or adjusted under 35 U.S.C. 154(b) by 7 days.

(21) Appl. No.: 14/531,199

(22) Filed: Nov. 3, 2014

(65) Prior Publication Data

US 2015/0122066 A1    May 7, 2015

Related U.S. Application Data

(60) Provisional application No. 61/898,735, filed on Nov. 1, 2013.

(51) Int. Cl.
| | |
|---|---|
| *B21D 22/14* | (2006.01) |
| *B23K 26/20* | (2014.01) |
| *F16H 55/12* | (2006.01) |
| *F16F 15/30* | (2006.01) |
| *F16D 1/076* | (2006.01) |

(52) U.S. Cl.
CPC ............... *F16H 55/12* (2013.01); *B21D 22/14* (2013.01); *B23K 26/20* (2013.01); *F16D 1/076* (2013.01); *F16F 15/30* (2013.01); *Y10T 29/49462* (2015.01); *Y10T 29/49465* (2015.01); *Y10T 29/49467* (2015.01); *Y10T 74/19865* (2015.01); *Y10T 74/19916* (2015.01)

(58) Field of Classification Search
CPC ............. F16D 1/076; F16D 3/77; F16F 15/30; F16F 15/283; F16F 15/1315; F16F 15/13142; B21D 22/14; B23K 26/20; B21K 1/30
See application file for complete search history.

(56) References Cited

U.S. PATENT DOCUMENTS

| 1,645,268 | A |   | 10/1927 | Walker |   |
|---|---|---|---|---|---|
| 2,516,365 | A | * | 7/1950 | Carraher | F16H 55/06 |
|   |   |   |   |   | 219/91.2 |
| 3,083,585 | A | * | 4/1963 | Dawe | F16H 55/30 |
|   |   |   |   |   | 29/402.08 |
| 3,225,616 | A |   | 12/1965 | Whitehead |   |
| 3,439,551 | A | * | 4/1969 | Militana | F16H 55/12 |
|   |   |   |   |   | 474/162 |
| 3,719,103 | A | * | 3/1973 | Streander | F16H 55/18 |
|   |   |   |   |   | 74/440 |

(Continued)

FOREIGN PATENT DOCUMENTS

WO    2005068873 A1    7/2005

*Primary Examiner* — William Kelleher
*Assistant Examiner* — Jude Agendia
(74) *Attorney, Agent, or Firm* — Standley Law Group LLP

(57) ABSTRACT

Embodiments include a modular flex plate assembly with a plurality of modular segments connectable with at least another modular segment by joining a first end of one modular segment to a second end of another modular segment to form a ring gear. The ring gear can be mounted to a substrate and mounted or fastened to a component of an engine or a transmission system. A plurality of securing devices can cooperatively engage the ring gear to a substrate, such that the gear teeth of the ring gear align with the perimeter edge of the substrate.

19 Claims, 11 Drawing Sheets

(56) References Cited

U.S. PATENT DOCUMENTS

| | | | | |
|---|---|---|---|---|
| 4,031,769 | A | * | 6/1977 | Kassing .................. F16H 55/12 474/162 |
| 4,078,445 | A | * | 3/1978 | Kiser, Jr. ................. F16H 55/30 29/893.3 |
| 4,462,269 | A | * | 7/1984 | Inglis .................. F16F 15/1315 123/185.1 |
| 5,158,505 | A | * | 10/1992 | Woyach ................. B65G 23/06 474/95 |
| 5,323,665 | A | * | 6/1994 | Rediker, Jr. .............. F16D 3/77 192/207 |
| 5,367,916 | A | * | 11/1994 | Bevc ....................... F16D 1/076 74/449 |
| 5,417,017 | A | * | 5/1995 | Toutountzis ............ A01M 1/24 174/107 |
| 5,482,400 | A | * | 1/1996 | Bavington .............. E02D 29/12 404/25 |
| 5,755,143 | A | * | 5/1998 | Mokdad ............ F16F 15/13407 464/68.4 |
| 6,074,316 | A | * | 6/2000 | Murrietta, Sr. ......... F16H 55/12 474/95 |
| 6,125,713 | A | * | 10/2000 | Langlois .................. B23P 6/00 29/402.01 |
| 7,819,766 | B2 | * | 10/2010 | Kennedy ................ F16D 1/076 403/197 |
| 2006/0096426 | A1 | * | 5/2006 | Park .................. B23K 26/0057 83/13 |
| 2013/0143703 | A1 | * | 6/2013 | Schlumpf ............... F16H 55/12 474/152 |
| 2013/0152652 | A1 | * | 6/2013 | Allwood ............... B21D 22/18 72/85 |

* cited by examiner

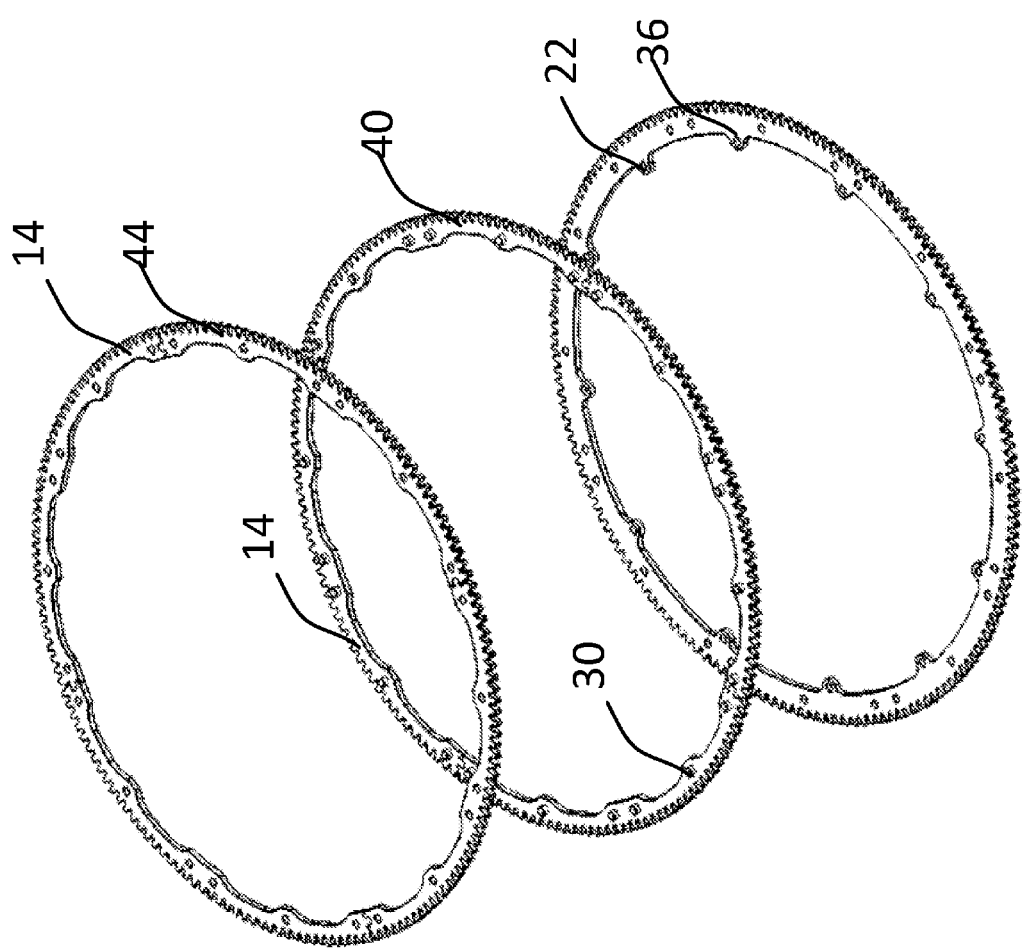

MODULAR FLEXPLATE

PRIORITY CLAIM

This application claims priority to U.S. Provisional Application No. 61/898,735 filed on Nov. 1, 2013, the disclosure of which is hereby incorporated by reference in its entirety.

FIELD

This disclosure generally relates to flexplate assemblies for transmission systems in automotive and other applications.

BACKGROUND

Internal combustion engines have been used for well over a century to power vehicles such as automobiles, truck, buses, boats, motorcycles and the like. Typically, an internal combustion engine generates power that is transmitted to the wheels, paddles, or other propulsion mechanisms of a vehicle to drive or propel the vehicle. Typically the power is transmitted from the internal combustion engine to the propulsion mechanism of the vehicle through a transmission system. One component that couples the internal combustion engine to the transmission system to assist in facilitating the transfer of power for the engine to the propulsion mechanism is a flexplate. More specifically, a flexplate typically connects an engine's crankshaft to an automatic transmission's torque converter. Alternatively, one or more ring gears can be mounted on a flywheel of a manual transmission system. Both flexplates and flywheels with ring gears on their perimeters can engage with the starter motor of vehicles. Flexplates typically comprise a disc-shaped body with teeth positioned along the outer edge of the disc-shaped body. Components for flexplates are typically manufactured from metals, such as steel, titanium, aluminum and the like through a stamping process, where a ring gear that includes teeth is welded onto the outer edge of the disc-shaped body.

SUMMARY OF THE INVENTION

Certain embodiments of the invention include modular flexplate assembly and methods of manufacturing same. A modular flexplate assembly includes a substrate, a plurality of modular segments, and a plurality of securing devices. The substrate and modular assembly each include a plurality of securing apertures. Modular segments are connectable with each other to form a ring gear. The ring gear is attachable to the substrate by the plurality of securing devices positioned in the apertures of the modular segments and substrate. The ring gear can be secured to the substrate by cooperative engagement of the plurality of securing devices to the substrate and the modular segments.

Certain embodiments of the invention also include a method of assembling a modular flexplate assembly. The method can include the step of providing a modular flexplate assembly, connecting each modular segment with at least one adjacent modular segment to form a ring gear, attaching each ring gear with the substrate such that the gear teeth of the ring gear align with the perimeter of the substrate, and cooperatively engaging the first surface of substrate with the ring gear using the plurality of securing devices.

BRIEF DESCRIPTION OF DRAWINGS

The following drawings are illustrative of particular embodiments of the present invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

FIG. 1E is an exploded perspective view of the modular flexplate of FIG. 1D;

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1A:
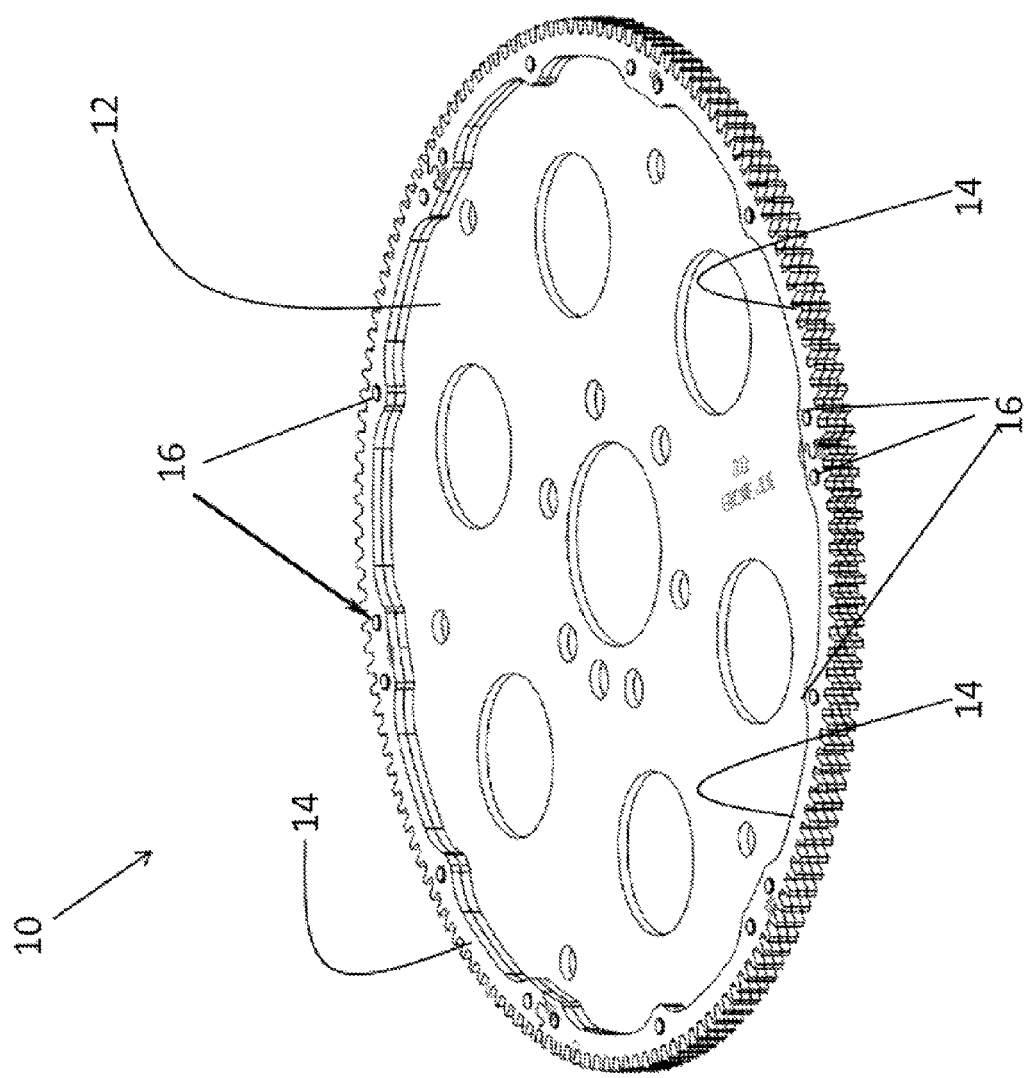
FIG. 1A is a perspective view illustrating one embodiment of a modular flexplate assembly.

FIG. 1A illustrates an example of a novel modular flexplate assembly 10. The modular flexplate assembly 10 includes a substrate 12, a plurality of modular segments 14, and a plurality of securing devices 16. As will be further described herein, the plurality of modular segments 14 can be arranged to form ring gears that can be secured to the substrate 12 using the plurality of securing devices 16.

The substrate 12 can be generally disc-shaped fabricated from a metal material such as steel. In one example, the substrate 12 is a plate. In one embodiment, the substrate 12 is fabricated from stock materials using a laser cutting process, i.e., using a laser to cut or otherwise shape a material. Typically, laser cutting is a computer-controlled and driven processes. An output of a high-power laser is directed to a piece or section of stock material to cut the material to desired dimensions. The output of the laser can melt, burn, or vaporize material and typically results in a relatively precise and high-quality cut. Laser cutting can be employed to form a substrate 12 from a stock steel sheet. Laser cutting can be used to form the circumference or perimeter of the substrate 12. In such cases, the substrate can be planar, with a first surface and a second surface opposite to the first surface as shown in FIG. 1A.

Figure 1B:
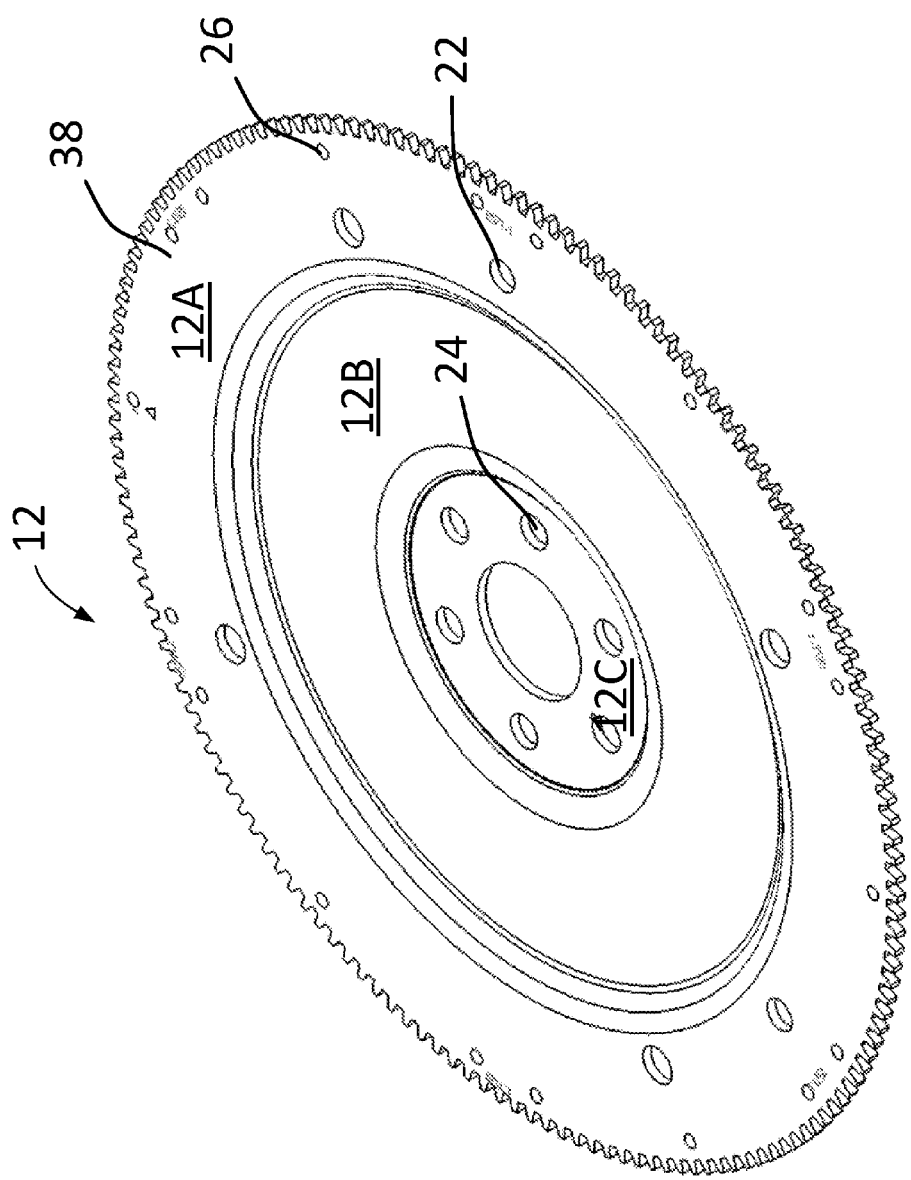
FIG. 1B is a perspective view illustrating a substrate according to a first embodiment of the modular flexplate assembly.
Figure 1C:
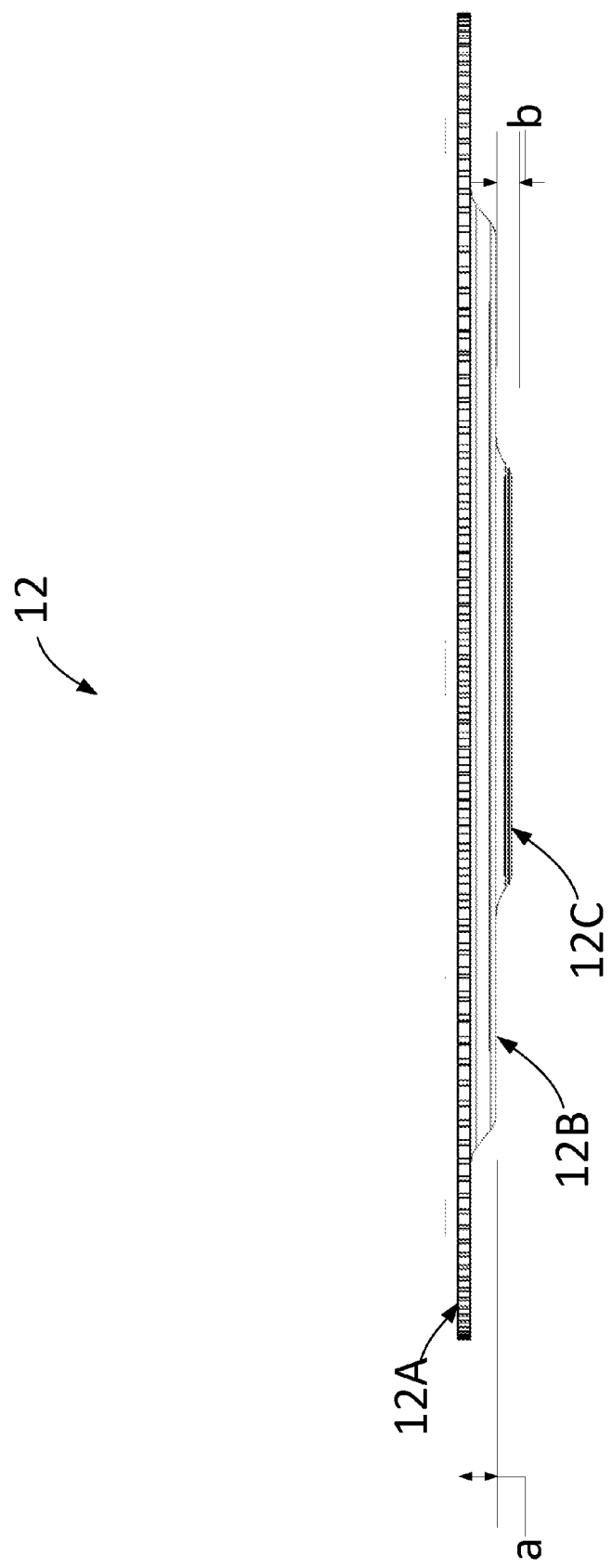
FIG. 1C is a front view of the substrate of FIG. 1B.

FIGS. 1B and 1C illustrates a flexplate assembly according to another embodiment. In this case, the substrate 12 can be non-planar, having a recessed portion. As illustrated, a first portion 12B of the first surface of the substrate 12 is recessed from a second portion 12A of the upper surface of the substrate 12. Additional recessed portions (e.g., portion 12C) are also contemplated. In the illustrated embodiment, the first portion 12A is recessed by a distance "a" from the second portion 12B. The portion 12C is recessed by a distance "b" from the first portion 12A. The substrate 12 illustrated in FIG. 1B is formed by spin forming. A stock material can be spun (e.g., in a lathe) by metal spinning process known in the art to produce a substrate 12 having a non-planar geometry such as the embodiment illustrated in FIG. 1B. In some cases, spin forming provides work hardening and strengthens the resulting substrate.

In one example, the substrate 12 is manufactured from steel although other metals (titanium, aluminum and the like) and alloys having sufficient strength suitable for withstanding various loads (e.g., torsional loads) acting on the flexplate during operation are contemplated. For instance, the substrate 12 can be made of low carbon alloy steel with molybdenum and chromium. The substrate 12 can be sized and shaped to be mounted in a variety of transmission systems. For instance, the substrate 12 can have a diameter of about 12.8 inches and a thickness of about 0.121 inches. In one example, the diameter of a fabricated substrate 12 can be between about 10 inches and about 16 inches, or other diameters suitable for use with a transmission systems.

Figure 2:
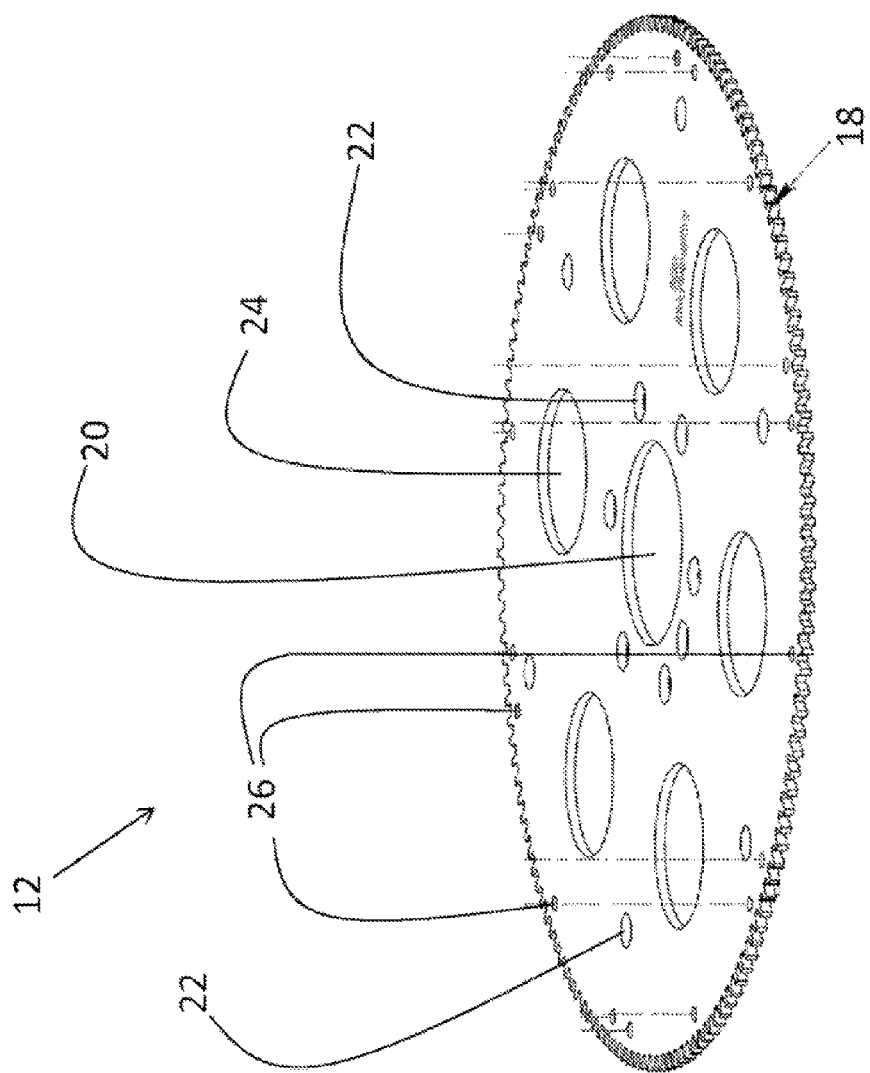
FIG. 2 is a perspective view of a substrate according to a second embodiment of the modular flexplate assembly of FIG. 1.

As illustrated in FIG. 2, the substrate 12 can include a number of substrate teeth 18 along the perimeter or circumference of the substrate 12. The substrate teeth 18 can be equally spaced and uniform along the entire perimeter of the substrate 12. In one example, the substrate teeth 18 can be spaced such that the substrate 12 has about four substrate teeth 18 for every linear inch of circumference of the substrate 12. It will be understood that the substrate 12 can be designed to include more than about four substrate teeth 18 per linear inch of circumference of the substrate 12. In another example, the substrate 12 can be designed to include less than about four substrate teeth 18 per linear inch of circumference of the substrate 12.

Figure 6:
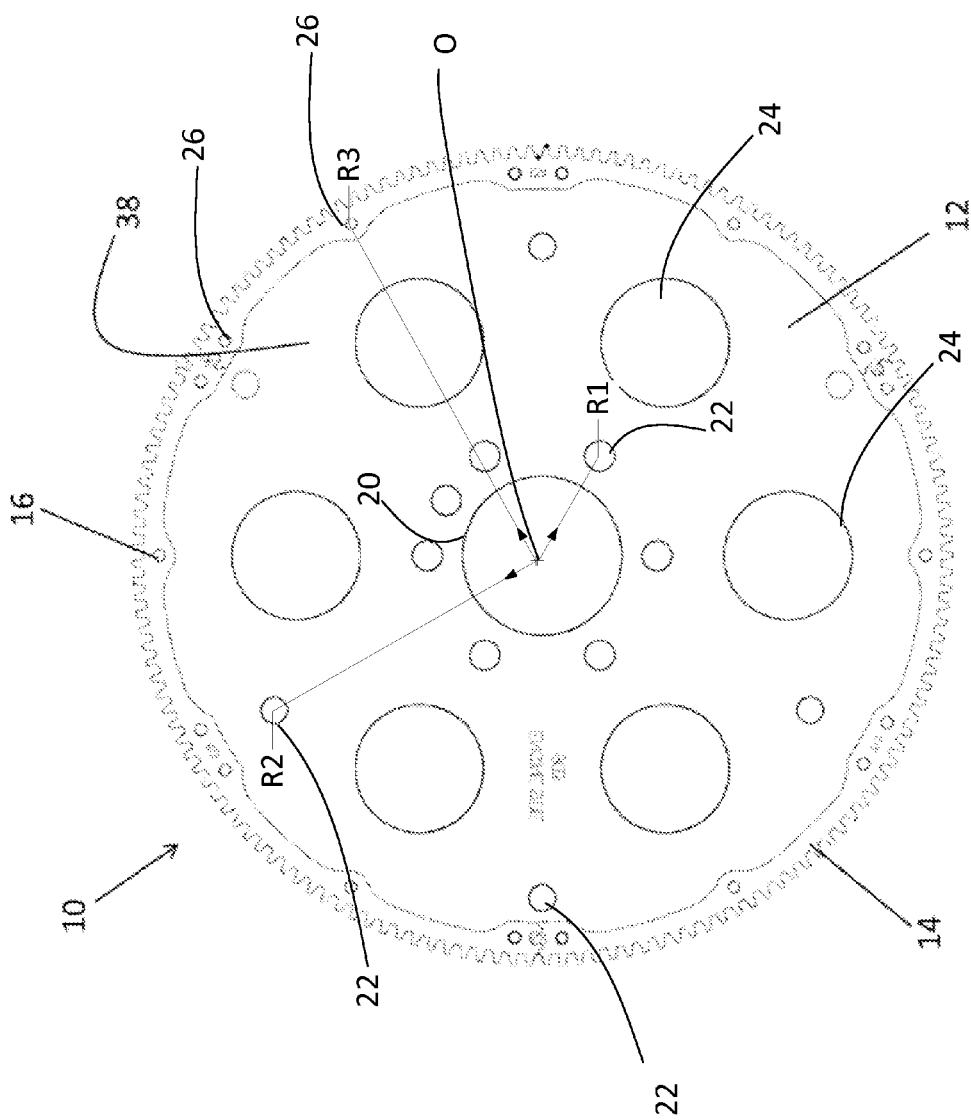
FIG. 6 is a top plan view of the modular flexplate assembly of FIG. 1.

As seen in FIG. 2, the substrate 12 can include a number of apertures passing through its body. For example, the substrate 12 can include a center aperture 20 through the center of the substrate 12 so that the modular flexplate assembly 10 can be mounted on a crankshaft (not shown). Additionally, a series of fastening apertures 22 can be defined on the substrate 12 around the center aperture 20 at a radial distance "R1" and "R2" from the geometric center "O" of the substrate 12 (best seen in FIG. 6). The fastening apertures 22 can be arranged to accommodate bolts or other such fasteners so that the modular flexplate 10 can be secured to other components of a vehicle such as a torque converter, or other components of a transmission system. It will be understood that additional fastening apertures 22 can be spaced along the substrate 12 to accommodate securing the modular flexplate assembly 10 to any number of components of an engine or transmission of a vehicle. While the illustrated embodiments show all the fastening apertures 22 defined at the same radial distance, other arrangements are also contemplated. For instance, the fastening apertures 22 can be defined (e.g., cut out from the substrate 12 by laser cutting) to align with cooperating apertures available on an engine component or a component of a transmission system. In such cases, the fastening apertures 22 may not all be at the same radial distance from the center of the substrate 12.

With continued reference to FIG. 2, the substrate 12 can further include a series of substrate securing apertures 26 spaced along its perimeter. As will be described herein, the substrate securing apertures 26 of the substrate 12 can work cooperatively with similar apertures in the modular segments 14 and the plurality of securing devices 16 to assemble the modular flexplate assembly 10. The substrate 12 can also include a series of selective apertures 24 that can be arranged to control or determine the overall weight and/or distribution of weight of the modular flexplate assembly 10. As described previously, the center aperture 20, fastening apertures 22, selective apertures 24 and substrate securing apertures 26 can be cut from the substrate 12 by laser cutting to desired dimensions (e.g., diameter) and spacing so that they conform to a desired tolerance.

Figure 1D:
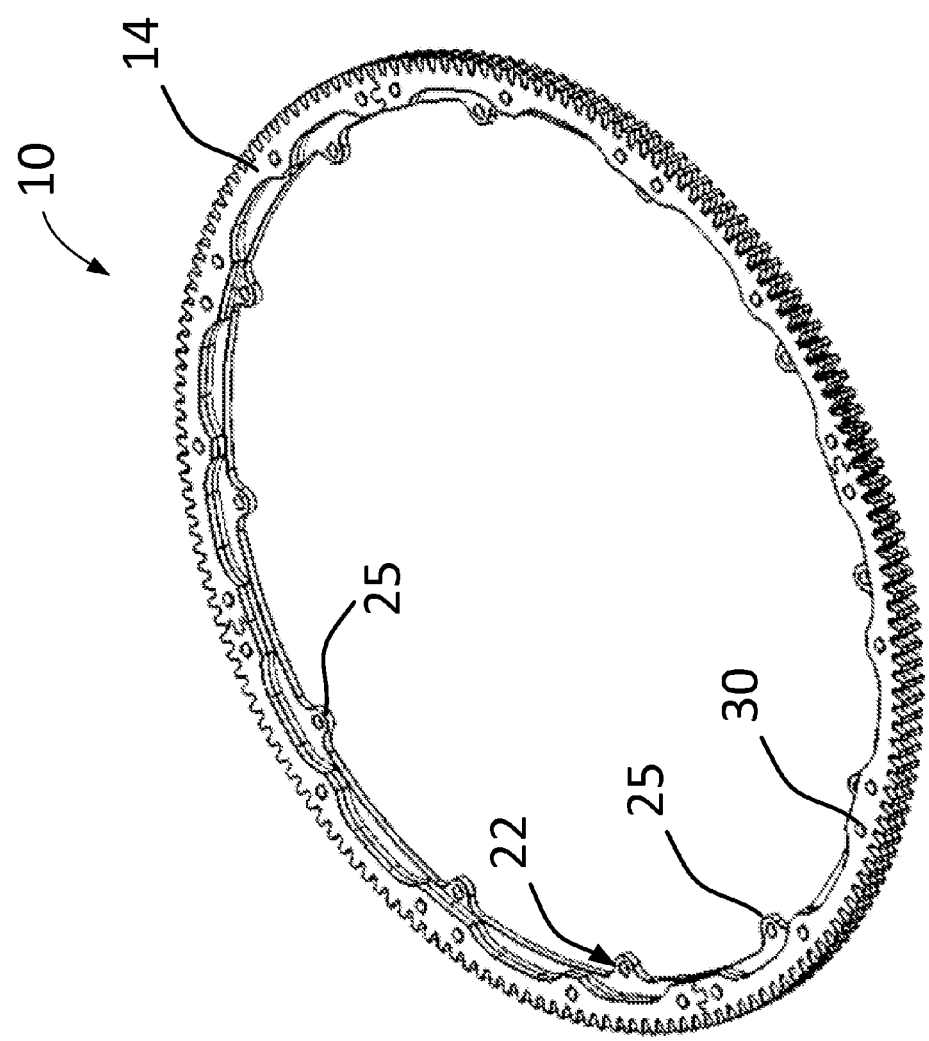
FIG. 1D is a perspective view illustrating a second embodiment of a modular flexplate assembly.

While FIG. 1A-1C illustrate a modular flexplate assembly 10 having a substrate 12, in other embodiments, the modular flexplate assembly 10 can be provided as a kit without a substrate, as shown in FIG. 1D and FIG. 1E. In such cases, the flexplate assembly comprises a plurality of modular segments formed into one or more ring gears 36, 40, 44 engageable with an external substrate. For instance, the external substrate can be a flywheel such as those known in the art. In some embodiments, the modular flexplate assembly 10 illustrated in FIGS. 1D and 1E can be configured to be mounted on a flywheel of a manual transmission vehicle. In such cases, the plurality of tabs 25 having fastening apertures 22 can be provided on the modular segments 14 to facilitate mounting (e.g., by bolt and nut connections) to the external substrate (e.g., flywheel).

Figure 3:
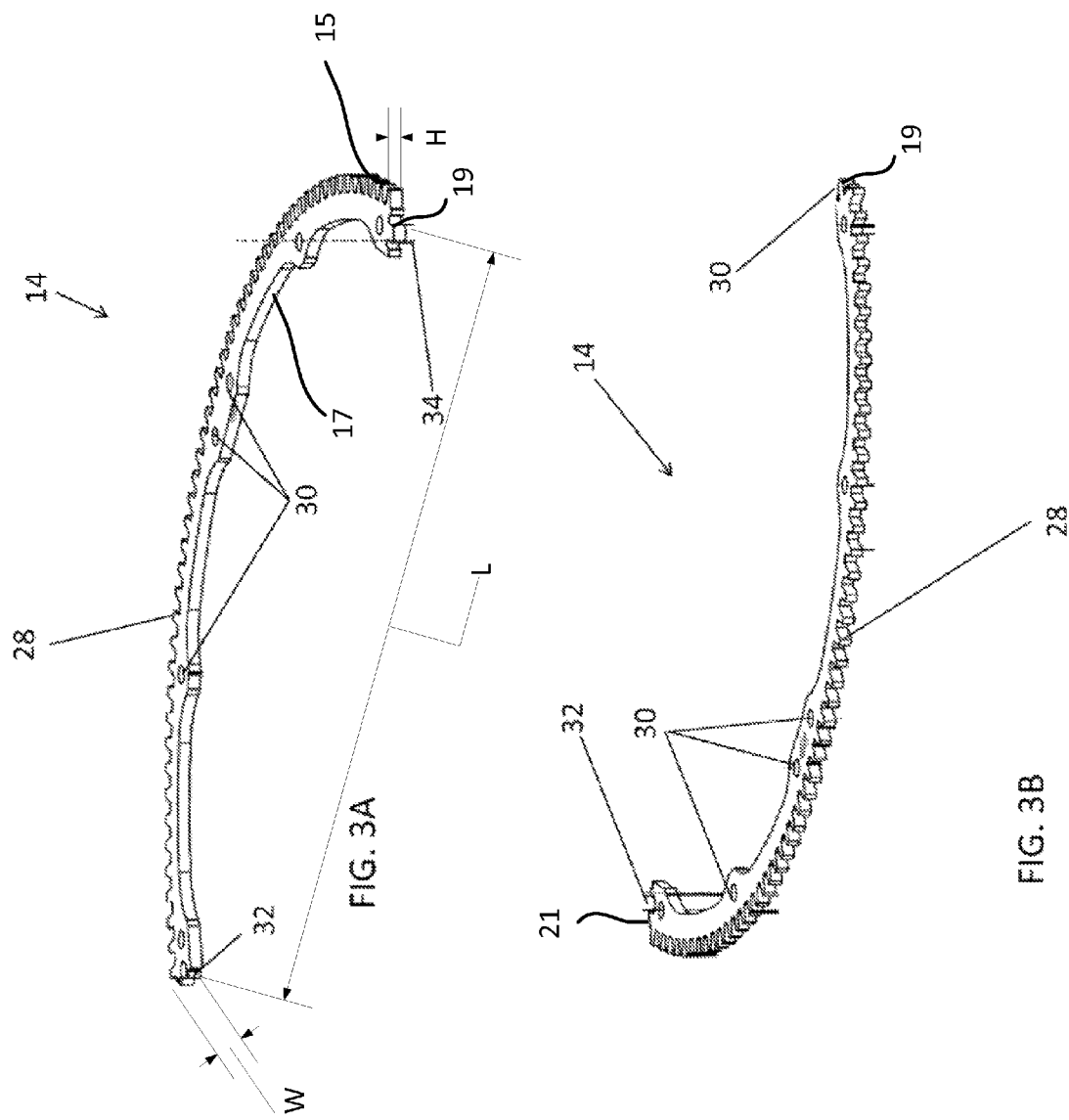
FIG. 3A is a front perspective view of a modular segment of the modular flexplate assembly of FIG. 1.
FIG. 3B is a rear perspective view of a modular segment of the modular flexplate assembly of FIG. 1.

As illustrated in FIGS. 3A and 3B, the plurality of modular segments 14 can each be arranged in a generally arcuate shape. Each modular segment 14 can have an outer edge 15 having an arcuate shape and an inner edge 17 opposite to the outer edge also having an arcuate shape. A plurality of segment teeth 28 can be disposed on the outer edge 15 of the modular segment. Each modular segment is connectable with at least another modular segment by joining a first end 19 of one modular segment to a second end 21 of another modular segment to form a ring gear, as will be described below.

The modular segments 14 can be fabricated from metals or alloys of sufficient strength to withstand various loads encountered by the flexplate assembly in a transmission system. For instance, the modular segments 14 can be fabricated from materials such as steel. As described with respect to the substrate 12 above, the modular segments 14 can be fabricated from a stock sheet of low carbon alloy steel strengthened with molybdenum and chromium. The modular segment 14 can be fabricated from a stock steel sheet. Laser cutting can be used to form the contours of the modular segment 14, including the arcuate outer and inner edges.

Referring now to FIG. 3A, each modular segment 14 can have an overall length "L", a width "W", and a thickness "H". In one example, a fabricated modular segment 14 can have an overall length "L" of about 11 inches, a width "W" of about 0.635 inches, and a thickness "H" of about 0.121 inches. It will be understood that modular segments 14 can be fabricated from other materials and result in other dimensions. For instance, the overall length "L" can be between about 5 and about 20 inches. The width "W" can be between about 0.1 and about 3 inches. The thickness "H" can be between about 0.01 and about 1 inches. In one example, the modular segments 14 can be fabricated to be thicker so as to increase the strength of the modular segments 14.

Each modular segment 14 can include a number of segment teeth 28 along the perimeter or outside arc of the arcuate-shaped modular segment 14. Laser cutting can be used to form the segment teeth 28. The segment teeth 28 can be equally spaced and uniform along the perimeter of the modular segment 14. In one example, the segment teeth 28 can be spaced such that there are about four segment teeth 28 for every linear inch of arc of the modular segments 14. However, as described above for the substrate 12, any number of segment teeth 14 can be provided based on the desired alignment between the substrate 12 and the segment teeth 14.

As illustrated in FIGS. 3A and 3B, each modular segment 14 can include a series of segment securing apertures 30 along the length of the modular segment 14. As will be described herein, the segment securing apertures 30 of the modular segments 14 can work cooperatively with substrate securing apertures 26 of the substrate 12, and the plurality of securing devices 16 to assemble the modular flexplate assembly 10. Each modular segment 14 can include a notch 32 on one of the first and second ends 19, 21 of the modular segment 14 and a tab 34 on the opposite end (other of the first and second ends 19, 21) of the modular segment 14. The notch 32 the tab 36, and securing apertures 30 can be formed laser cutting. As illustrated in FIG. 1, the notch 32 of one modular segment 14 can accommodate the tab 34 of another modular segment 14 so that a series of modular segments 14 can be arranged as a ring gear. It will be understood that such an arrangement can interlock modular segments 14 to form a ring gear. Although a system of a notch 32 and a tab 34 is illustrated and described, it will be understood that other interlocking system can be utilized to form ring gears from modular segments.

Figure 4:
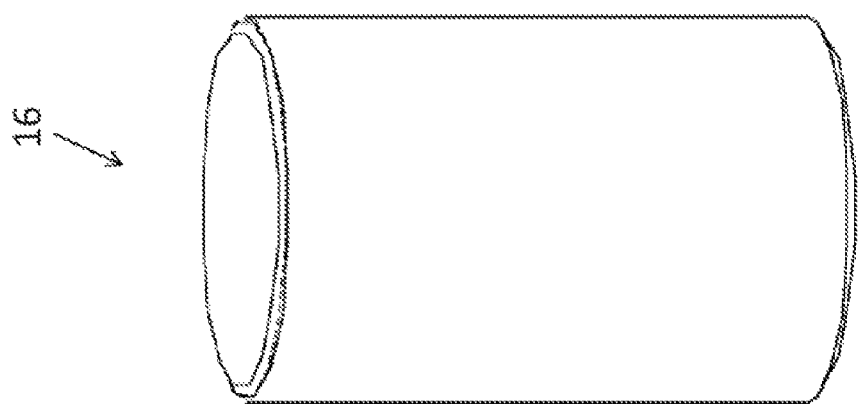
FIG. 4 is a perspective view of a securing device of the modular flexplate assembly of FIG. 1.

As illustrated in FIG. 4, the plurality of securing devices 16 can each be a cylindrical pin, although other cross-sectional shapes of the securing device 16 such as hexagonal, square and the like are contemplated. While the illustrated embodiment shows the securing devices arranged to be inserted into securing apertures at a radial distance "R3" from the geometric center of the flexplate (e.g., center of the substrate and the ring gear), the securing devices 16 can be arranged in any configuration. For instance, the securing devices 16 can be at different radial distances from the center. The securing devices 16 can be fabricated from metals such as steel. Laser cutting can be used to form the securing device 16, including cutting the securing device 16 to the desired length. As described above, the securing devices 16 can be fabricated from a relatively low carbon alloy steel strengthened with molybdenum and chromium. In one example, the securing device 16 can have a diameter of about 0.188 inches and an overall length of approximately 0.45 inches. It will be understood that securing devices 16 can be fabricated from other materials and result in other dimensions. In one example, the securing devices 16 can be fabricated to be longer or shorter in length to accommodate substrates 12 and modular segments 14 that are designed to have different thicknesses than those disclosed above. In another example, the diameter of the securing devices 16 can be greater of less than approximately 0.188 inches to accommodate substrate and segment substrate and segment securing apertures (26, 30) of varying diameter.

Figure 5:
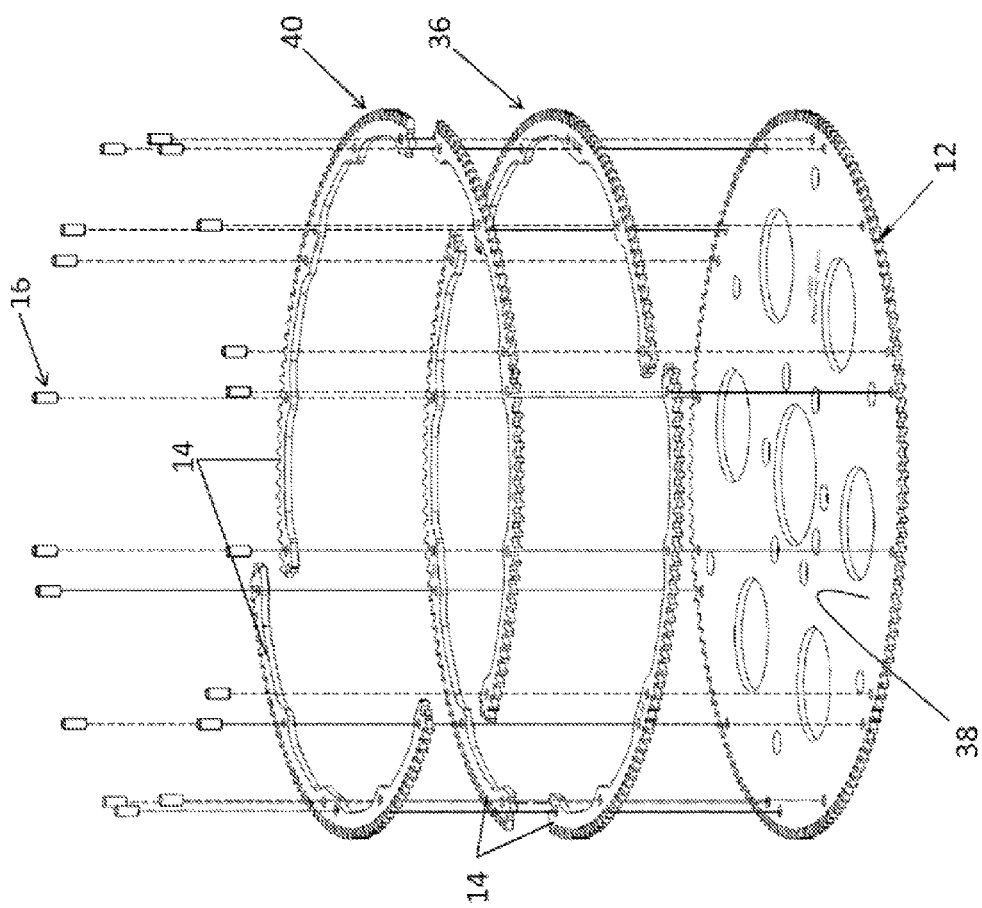
FIG. 5 is an exploded view of the modular flexplate assembly of FIG. 1.
Figure 7:
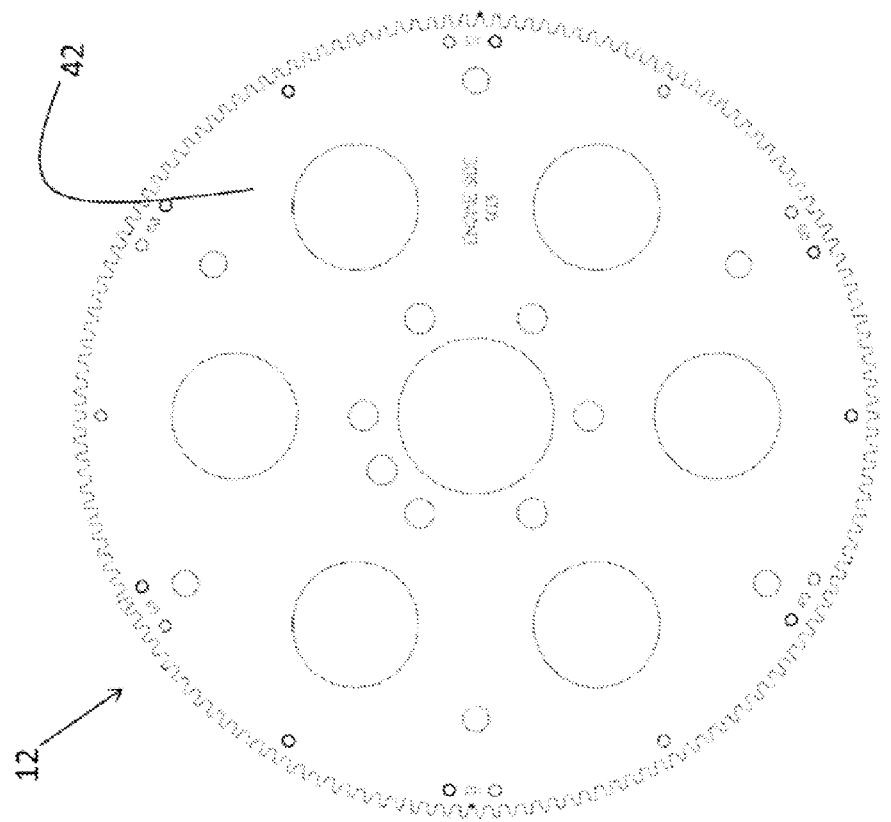
FIG. 7 is a bottom plan view of the modular flexplate assembly of FIG. 1.

As illustrated in FIG. 5, the substrate 12, a plurality of modular segments 14, and a plurality of securing devices 16 can be cooperatively assembled to manufacture a modular flexplate assembly 10. In the embodiment illustrated in FIG. 5, three modular segments 14 are assembled to form a first ring gear 36. A tab 34 from each modular segment 14 is engaged with a notch 32 of an adjacent modular segment 14. In this manner, a plurality of modular segments 14 can be connected with each other to form the first ring gear 36. This first ring gear 36 is positioned on a first surface 38 of the substrate 12 so that the substrate securing apertures 26 of the substrate 12 align with the segment securing apertures 30 of the modular segments 14. Additionally, the first ring gear 36 is positioned on a first surface 38 of the substrate 12 so that an outer perimeter of the substrate 12 aligns with the segment teeth 28 of the modular segments 14. In some examples, the substrate teeth 18 align with the segment teeth 28. A second surface 42 (best seen in FIG. 7) opposite to the first surface 38 can face the component of the transmission system to which the modular flexplate assembly 10 is mounted.

As further illustrated in the embodiment of FIG. 5, the modular segments 14 are assembled into a second ring gear 40. A tab 34 from each modular segment 14 is engaged with a notch 32 of an adjacent modular segment 14. In this manner a plurality of modular segments 14 can be connected to each other to form the second ring gear 40. This second ring gear 40 is positioned on a first ring gear 36 so that the substrate securing apertures 26 of the substrate 12 and the segment securing apertures 30 of the modular segments 14 of the first ring gear 36 align with the segment securing apertures 30 of the modular segments 14 of the second ring gear 40. While the illustrated embodiment of FIG. 5 shows three modular segments 14 forming the first ring gear 36 and three modular segments 14 forming the second ring gear 40, any number of modular segments 14 can be used. Additionally, any number of ring gears can be formed from modular segments 14. While the illustrated embodiments show the ring gears stacked on top of each other, with the first ring gear 36 coupled to the substrate 12, the stacking can be such that ring gears are positioned on first and second surfaces 38, 42 of the substrate 12, with the substrate 12 sandwiched between a number of ring gears. Such an embodiment is also contemplated when ring gears are mounted to an external substrate such as a flywheel.

In the embodiment of FIG. 5, the substrate 12 includes eighteen substrate securing apertures 26 and each ring gear (36, 40) includes eighteen segment securing apertures 30 (i.e., each modular segment 14 includes six segment securing apertures 30 so that assembling three such modular segments 14 into a ring gear (36, 40) results in eighteen securing apertures 30). Additionally, the second ring gear 40 is positioned on a first ring gear 36 so that segment teeth 28 of the second ring gear 40 align with both the substrate teeth 18 and the segment teeth 28 of the first ring gear 36.

It will be understood that upon positioning the first ring gear 36 and second ring gear 40 onto the substrate 12, the substrate and segment securing apertures (26, 30) align to form a plurality of through-passages in the assembly of the substrate 12 and ring gears (36, 40). In the illustrated embodiment, the substrate and segment securing apertures (26, 30) form eighteen through-passages in the assembly. It is noted that in the embodiment of FIG. 5, the interlocking connections that form the first ring gear 36 and those that form the second ring gear 40 are offset. This is to say that the locations at which modular segments 14 engage to form the first ring gear 36 are not aligned with the locations at which modular segments 14 engage to form the second ring gear 40. In other words, the first ring gear 36 and second ring gears 40 are staggered so as not to align the interlocking locations.

Referring again to the embodiment of FIG. 5, to assemble and secure the first ring gear 36 and second ring gear 40 to the substrate 12, the securing devices 16 are press fit through the aligned substrate and segment securing apertures (26, 30). The securing devices 16 and substrate and segment securing apertures (26, 30) can be of a desired dimension so that an interference fit is formed when the securing devices 16 are inserted into the substrate and segment securing apertures (26, 30). Once the securing devices 16 are secured in the substrate and segment securing apertures (26, 30), a welding processes can be performed to weld the securing devices 16 into the substrate and segment securing apertures (26, 30) to further secure the components into a modular flexplate assembly 10. In one embodiment, the securing devices 16 can be laser welded from both ends of the securing device 16 so that a weld forms along the substantially the entire length of the securing device 16 to secure the securing device 16 to the substrate 12 and each modular segment 14 the securing device 16 passes through. It will be understood that such a welding method facilitates the secure assembly of the substrate 12 and modular segments 14 into a modular flexplate assembly 10. In another embodiment, a tungsten inert gas ("TIG") welding process is used to weld the securing devices 16 into the substrate 12 and modular segments 14.

The embodiment disclosed in FIG. 5 includes three modular segments 14 to form a ring (36 or 40) and eighteen securing devices 16 securing the ring gears (36, 40) and the substrate 12. It will be understood that this is an exemplary embodiment only. A modular flexplate assembly can be assembled using more or less than three modular segments to form gear rings and more or less than eighteen pins and securing apertures. Additionally, any number of ring gears can be stacked to form the complete assembly. When stacking, the interlocking location of adjacent ring gears can be arranged so that they are staggered. In some cases, the staggering may result in interlocking location of ring gears non-adjacent to each other being inline.

It will be understood that the modular flexplate assembly 10 can be arranged so that the substrate teeth 18, segment teeth 28 of the first ring gear 36, and segment teeth 28 of the second ring gear 36 are aligned so that once the modular flexplate assembly 10 is completed, the three sets of substrate and segment teeth (18, 28) cooperatively interact so as to form a ring gear assembly that can engage with a component of an engine or a transmission system. This is to say that the substrate and segment teeth (18, 28) join together to engage with a component of the engine or transmission system. It will be understood that the number of ring gears and the thickness of the stock material of the substrate 12 and modular segments 14 can be adjusted as needed to create the necessary strength and flexibility required for any particular application. Additionally, the flexplate assembly can include a planar or a non-planar substrate 12 to accommodate different types of transmission systems. Alternatively, the flexplate assembly 10 may not include a substrate 12 and be mounted directly to a flywheel or another component of a transmission system.

Embodiments of the invention also include a method of assembling a modular flexplate assembly. The method can include the steps of providing a modular flexplate assembly such as those disclosed above. The method can include the step of connecting each modular segment with at least one adjacent modular segment by joining the first end of one modular segment to the second end of the adjacent modular segment to form a ring gear. The method can include the step of attaching each ring gear with the substrate such that the gear teeth of the ring gear align with the perimeter of the substrate. The method can include the step of cooperatively engaging the first surface of substrate with the ring gear using the plurality of securing devices. The method can include the step of welding the plurality of securing devices along a substantial length of the securing devices to the ring gear and the substrate to form the flexplate assembly. The method can also include the step of providing a plurality of fastening apertures on the substrate, mounting the modular flexplate assembly to a transmission system or a vehicle engine, and fastening the modular flexplate assembly to at least one of a transmission system or a vehicle engine using a plurality of fasteners inserted into the fastening apertures of the substrate.

Embodiments of the invention can provide one or more advantages. For instance, a modular flexplate assembly can be designed according to precise specifications based on the type of engine component or transmission system it will be mounted to. As described herein, laser cutting can be employed to form various components of the modular flexplate resulting in more accurate dimensions. In one example, dimensional accuracies and tolerances can be about 0.003 inches using laser cutting. Furthermore, when designing a new or modifying an existing modular flexplate assembly, employing laser cutting can result in relatively fast production and less lead time from design to production.

Embodiments including a spun-formed substrate can result higher strength (on the order of about 85,000 psi when using 50,000 psi strength stock material) than typically obtainable with stamped substrates, resulting in a durable flexplate assembly. The modular assembly process also results in providing a flexplate with any number of layers of ring gears, thereby increasing the stacked width of the gear teeth of all the gears. Higher width of the gear teeth in turn facilitates the flexplate assembly to withstand much higher torques than those that can be withstood a single ring gear.

Manufacturing modular flexplate assemblies as described herein can result in flexplates that are lightweight, having desired strength required to withstand different loads during operation, desired durability, and easily configurable to engage with different types of transmission systems. Additionally, the substrate, modular segments, and pins are fabricated from the same material thereby reducing or eliminating issues of strength and durability that arise when welding dissimilar metals. In addition, using a securing device and a securing aperture arrangement limits the number and size of welds required, thus, offering fewer opportunities for welds to fail. The limited welding also decreases the exposure to heat, and limited or no warping of the planar substrate resulting in flatter flexplate assemblies. Also, embodiments described herein can have a symmetric and uniform flexplate assembly and limits the amount of material added to the flexplate due to welding which results in a more balanced flexplate. Such a balanced flexplate can reduce or eliminate the need to weld or attach additional material to the flexplate to compensate weight imbalances.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention.

What is claimed is:

1. A modular flexplate assembly, comprising:
   a disc-shaped substrate having
     a center,
     a first perimeter edge,
     a first surface, and
     a second surface opposite to the first surface substantially uniformly parallel to the first surface;
   a plurality of modular segments, each modular segment having
     an outer edge having an arcuate shape,
     an inner edge opposite to the outer edge, the inner edge having an arcuate shape,
     a first end, and
     a second end, and
     a plurality of segment teeth disposed on the outer edge of the modular segment,
   each modular segment connectable with at least another modular segment by joining the first end of one modular segment to the second end of another modular segment to form a ring gear, the circumference of the dedendum circle of said ring gear being substantially the same as the circumference of the first perimeter edge of the disc-shaped substrate; and
   a plurality of unthreaded cylindrical securing devices adapted to cooperatively engage the ring gear to the first surface of the substrate such that the gear teeth of the ring gear align with the perimeter edge of the substrate.

2. The modular flexplate assembly of claim 1, wherein the substrate is substantially planar.

3. The modular flexplate assembly of claim 2, wherein the substrate is a flywheel of an automotive transmission system.

4. The modular flexplate assembly of claim 1, wherein the substrate is substantially nonplanar, with a first portion of the first surface being recessed from a second portion of the first surface.

5. The modular flexplate assembly of claim 1, wherein the substrate has a plurality of substrate teeth defined on a perimeter of the substrate, the dedendum circle of the substrate teeth substantially aligning with the first perimeter edge, the substrate having a second perimeter edge that aligns with an addendum circle of the substrate teeth wherein, when assembled, each substrate tooth aligns longitudinally along a direction parallel to the flexplate axis with a segment gear tooth.

6. The modular flexplate assembly of claim 1, further comprising a plurality of substrate securing apertures positioned on the substrate at a first radial distance from the substrate center, and a plurality of segment securing apertures positioned on each modular segment positioned at the first radial distance from a center of the ring gear, such that when the ring gear is assembled to the substrate, at least two or more of the substrate securing apertures align with two or more of the segment securing apertures.

7. The modular flexplate assembly of claim 6, wherein each unthreaded cylindrical securing device is adapted to be inserted into one of the plurality of substrate securing apertures and the segment securing apertures aligned with the substrate securing aperture.

8. The modular flexplate assembly of claim 7, wherein the flexplate assembly is assembled by cooperative engagement between the unthreaded cylindrical securing device and substrate securing apertures and segment securing apertures.

9. The modular flexplate assembly of claim 8, wherein each unthreaded cylindrical securing device forms an interference fit with the substrate securing aperture and the segment securing aperture through which the pin is inserted when the modular flexplate assembly is assembled.

10. The modular flexplate assembly of claim 1, wherein each modular segment comprises a notch defined on one of the first and second ends and a tab defined on the other of the first and second ends, the notch of one of the plurality of modular segments attachable to the tab of an adjacent modular segment, the notch and the tab adapted to form an interlocking connection there between such that when interlocked, the plurality of the modular segments connect with each other to form the ring gear.

11. The modular flexplate assembly of claim 1, further comprising a plurality of fastening apertures defined on the substrate at a second radial distance from the center of the substrate, the fastening apertures adapted to receive a plurality of fasteners for fastening the flexplate assembly to a transmission system.

12. The modular flexplate assembly of claim 1, wherein the plurality of segment teeth are uniformly and equally spaced around the perimeter of each of the modular segments.

13. The modular flex plate assembly of claim 1, further comprising an additional ring gear formed of modular segments coupled to each other, the additional ring gear connectable to the ring gear so that the teeth of the two ring gears align, the additional ring gear oriented such that the connection between ends of the modular segments does not align with such a connection on an adjacent first ring gear.

14. A modular flex plate assembly, comprising:
   a plurality of modular segments, each modular segment having
     an outer edge having an arcuate shape,
     an inner edge opposite to the outer edge, the inner edge having an arcuate shape,
     a first end,
     a second end,
     a first and second surface each adjoining the outer edge and the inner edge, and
     a plurality of segment teeth disposed on the outer edge of the modular segment,
   each modular segment connectable with at least another modular segment by joining the first end of one modular segment to the second end of another modular segment to form a ring gear; and
   a plurality of securing devices adapted to cooperatively engage the ring gear to a substrate, such that the gear teeth of the ring gear align with a perimeter edge of the substrate.

15. A method of assembling a modular flexplate assembly, comprising:
   providing a modular flexplate assembly, comprising
     a disc-shaped substrate having
       a center,
       a perimeter edge,
       a first surface, and
       a second surface opposite to the first surface,
     a plurality of modular segments, each modular segment having
       an outer edge having an arcuate shape,
       an inner edge opposite to the outer edge, the inner edge having an arcuate shape,
       a first end,
       a second end, and a plurality of segment teeth disposed on the outer edge of the modular segment, and a plurality of securing devices;

connecting each modular segment with at least one adjacent modular segment by joining the first end of one modular segment to the second end of the adjacent modular segment to form a ring gear;

attaching each ring gear with the substrate such that the gear teeth of the ring gear align with the perimeter edge of the substrate; and cooperatively engaging the first surface of substrate with the ring gear using the plurality of cylindrical securing devices.

16. The method of claim 15, further comprising welding the plurality of securing devices along a substantial length of the cylindrical securing devices to the ring gear and the substrate to form the flexplate assembly.

17. The method of claim 15, wherein each of the substrate, the modular segments, the segment teeth and the securing devices are formed by laser machining.

18. The method of claim 15, wherein the substrate is formed by metal spinning process such that the substrate is substantially non-planar, with a first portion of the first surface being recessed from a second portion of the first surface.

19. The method of claim 15, further comprising providing a plurality of fastening apertures on the substrate, mounting the modular flexplate assembly to a transmission system or a vehicle engine, and fastening the modular flexplate assembly to at least one of a transmission system or a vehicle engine using a plurality of fasteners inserted into the fastening apertures of the substrate.

* * * * *